(12) United States Patent
Baruch et al.

(10) Patent No.: US 11,705,991 B2
(45) Date of Patent: Jul. 18, 2023

(54) SELECTIVE RETRANSMISSION FOR VEHICLE-TO-EVERYTHING COMMUNICATIONS

(71) Applicant: QUALCOMM Incorporated, San Diego, CA (US)

(72) Inventors: Doron Baruch, Hod Hasharon (IL); Michael Levitsky, Rehovot (IL)

(73) Assignee: QUALCOMM Incorporated, San Diego, CA (US)

( * ) Notice: Subject to any disclaimer, the term of this patent is extended or adjusted under 35 U.S.C. 154(b) by 244 days.

(21) Appl. No.: 17/158,472

(22) Filed: Jan. 26, 2021

(65) Prior Publication Data

US 2021/0250126 A1 Aug. 12, 2021

Related U.S. Application Data

(60) Provisional application No. 62/972,551, filed on Feb. 10, 2020.

(51) Int. Cl.
*H04L 1/08* (2006.01)
*H04L 41/06* (2022.01)
*H04L 43/16* (2022.01)
*H04W 4/46* (2018.01)
*H04W 72/56* (2023.01)

(52) U.S. Cl.
CPC .............. *H04L 1/08* (2013.01); *H04L 41/06* (2013.01); *H04L 43/16* (2013.01); *H04W 4/46* (2018.02); *H04W 72/56* (2023.01)

(58) Field of Classification Search
CPC . H04L 1/08; H04L 1/189; H04L 41/06; H04L 41/0609; H04L 41/0686; H04L 43/16; H04W 4/12; H04W 4/46; H04W 4/90; H04W 72/10; G08G 1/162; Y04S 40/00
See application file for complete search history.

(56) References Cited

U.S. PATENT DOCUMENTS

2013/0083679 A1* 4/2013 Krishnaswamy ....... H04L 67/61 370/252
2016/0164792 A1* 6/2016 Oran ................... H04L 43/0852 370/236

FOREIGN PATENT DOCUMENTS

WO WO-2019002073 A1 * 1/2019 ........... H04L 5/0048

* cited by examiner

*Primary Examiner* — Hoon J Chung
(74) *Attorney, Agent, or Firm* — Alan Gordon

(57) ABSTRACT

Various aspects of the present disclosure generally relate to wireless communication. In some aspects, a user equipment (UE) may receive a warning message comprising a first indication of a priority of the warning message and a second indication that identifies an event. The UE may transmit a repetition of the warning message based at least in part on the first indication. Numerous other aspects are described.

26 Claims, 8 Drawing Sheets

SELECTIVE RETRANSMISSION FOR VEHICLE-TO-EVERYTHING COMMUNICATIONS

CROSS-REFERENCE TO RELATED APPLICATION

This Patent application claims priority to Provisional Patent Application No. 62/972,551, filed on Feb. 10, 2020, entitled "SELECTIVE RETRANSMISSION FOR VEHICLE TO EVERYTHING COMMUNICATIONS," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for selective retransmission for vehicle-to-everything communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a UE, may include receiving a warning message comprising a first indication of a priority of the warning message and a second indication that identifies an event; and transmitting a repetition of the warning message based at least in part on the first indication.

In some aspects, a UE for wireless communication may include memory and one or more processors operatively coupled to the memory. The memory and the one or more processors may be configured to receive a warning message comprising a first indication of a priority of the warning message and a second indication that identifies an event; and transmit a repetition of the warning message based at least in part on the first indication.

In some aspects, a non-transitory computer-readable medium may store one or more instructions for wireless communication. The one or more instructions, when executed by one or more processors of a UE, may cause the one or more processors to: receive a warning message comprising a first indication of a priority of the warning message and a second indication that identifies an event; and transmit a repetition of the warning message based at least in part on the first indication.

In some aspects, an apparatus for wireless communication may include means for receiving a warning message comprising a first indication of a priority of the warning message and a second indication that identifies an event; and means for transmitting a repetition of the warning message based at least in part on the first indication.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
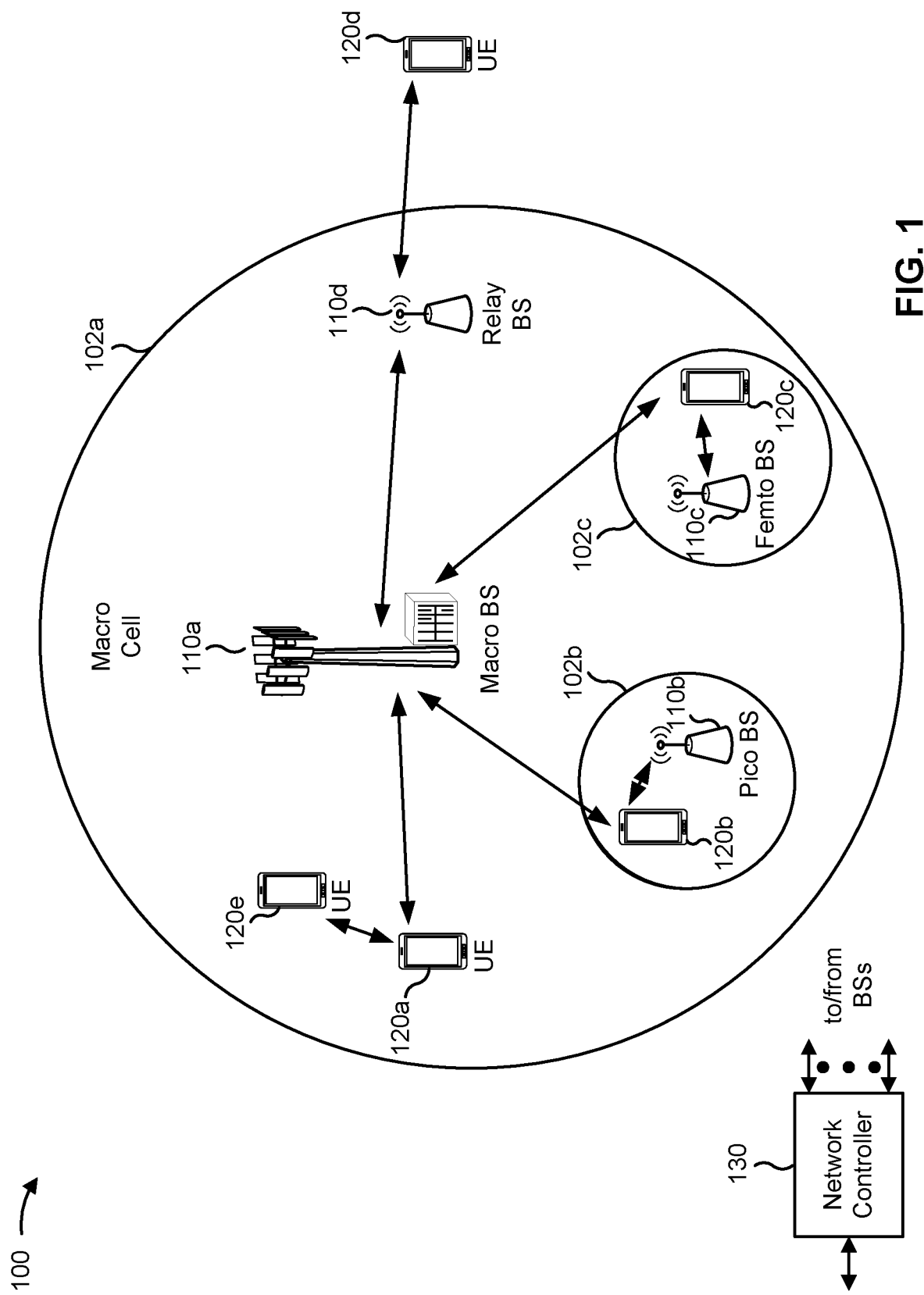
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a hand-held device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a cellular V2X (C-V2X) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
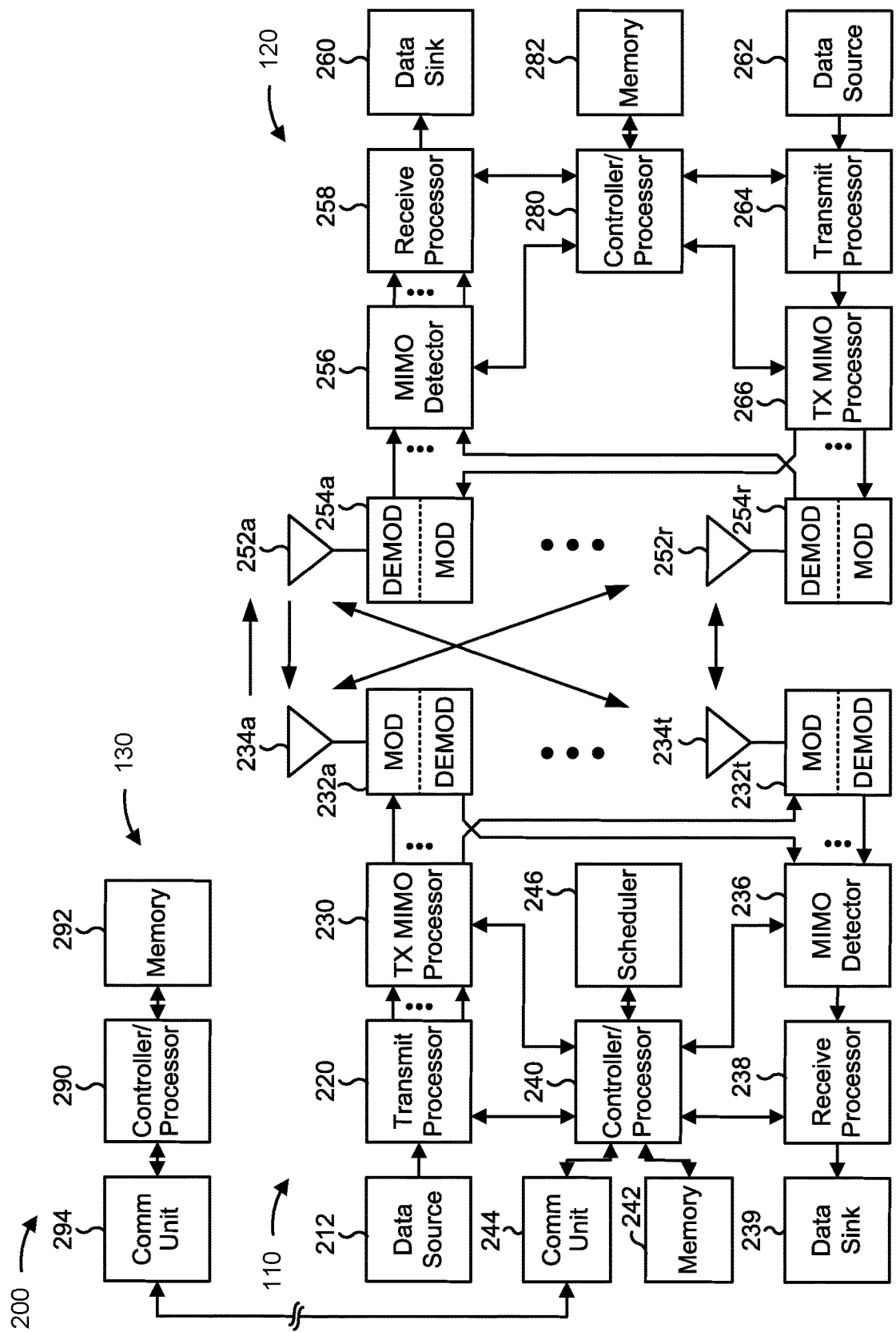
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 5-8.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 5-8.

Controller/processor 240 of base station 110, controller/processor 280 of UE 120, and/or any other component(s) of FIG. 2 may perform one or more techniques associated with selective retransmission for V2X communications, as described in more detail elsewhere herein. For example, controller/processor 240 of base station 110, controller/processor 280 of UE 120, and/or any other component(s) of FIG. 2 may perform or direct operations of, for example, process 800 of FIG. 8 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, and/or other processes as described herein. In some aspects, executing instructions may include running the instructions, converting the instructions, compiling the instructions, and/or interpreting the instructions, among other examples.

In some aspects, the UE includes means for receiving a warning message comprising a first indication of a priority of the warning message and a second indication that identifies an event; and/or means for transmitting a repetition of the warning message based at least in part on the first indication. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for determining to transmit the repetition of the warning message based at least in part on the priority of the warning message satisfying a priority threshold, wherein transmitting the repetition of the warning message is based at least in part on the determination to transmit the repetition of the warning message.

In some aspects, the UE includes means for indicating, within the repetition of the warning message, that the repetition of the warning message is a repetition.

In some aspects, the UE includes means for indicating, within the repetition of the warning message, a timing offset between receiving the warning message and transmitting the repetition of the warning message.

In some aspects, the UE includes means for determining a timing offset of a number of subframes between reception of the warning message and transmission of the repetition of the warning message by the UE.

In some aspects, the UE includes means for generating the random timing offset based at least in part on an offset range.

In some aspects, the UE includes means for determining to transmit the repetition of the warning message based at least in part on one or more of:

In some aspects, the UE includes means for determining whether receiving the warning message comprises receiving a repetition of the warning message based at least in part on one or more of a determination that the UE has not already received a transmission of a repetition of the warning message from an intermediate UE, or a determination that a count of hops indicated within the warning message satisfies a hop quantity threshold.

As indicated above, FIG. 2 is provided as an example. Other examples may differ from what is described with regard to FIG. 2.

Figure 3:
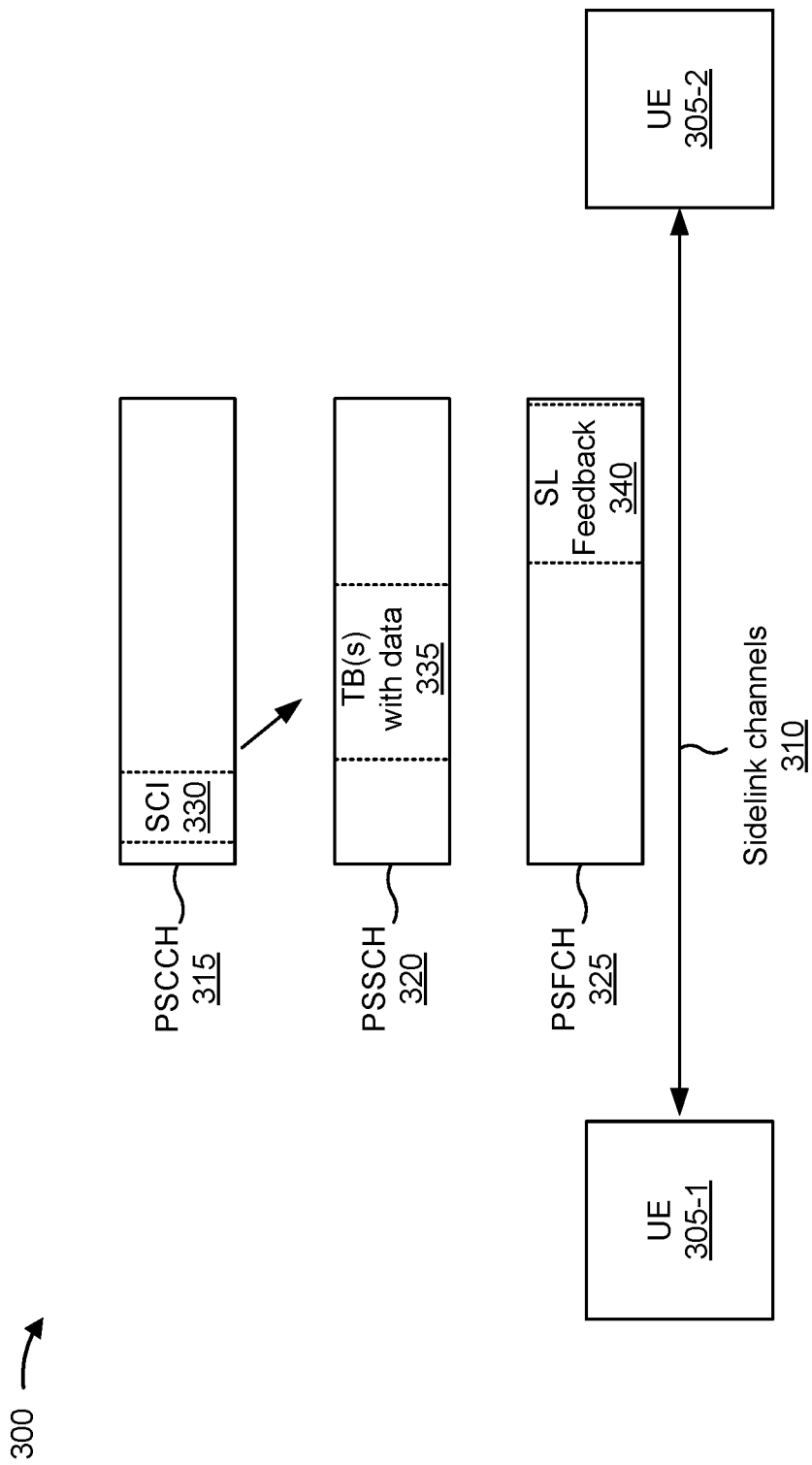
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, V2P communications, and/or the like), mesh networking, and/or the like. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on the PSSCH 320. In some aspects, the control information may be transmitted in two stages. In some aspects, the first stage may include transmitting a first set of SCI fields and the second stage may include transmitting a second set of SCI fields. The transmission of the second set of SCI fields may be transmitting with a PSSCH 320 transmission and may be included on a first portion of resources carrying the PSSCH 320 transmission. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), a scheduling request (SR), and/or the like.

In some aspects, the one or more sidelink channels 310 may use resource pools. For example, a scheduling assignment (e.g., included in SCI 330) may be transmitted in sub-channels using specific resource blocks (RBs) across time and/or frequency. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, a modulation and coding scheme (MCS) to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
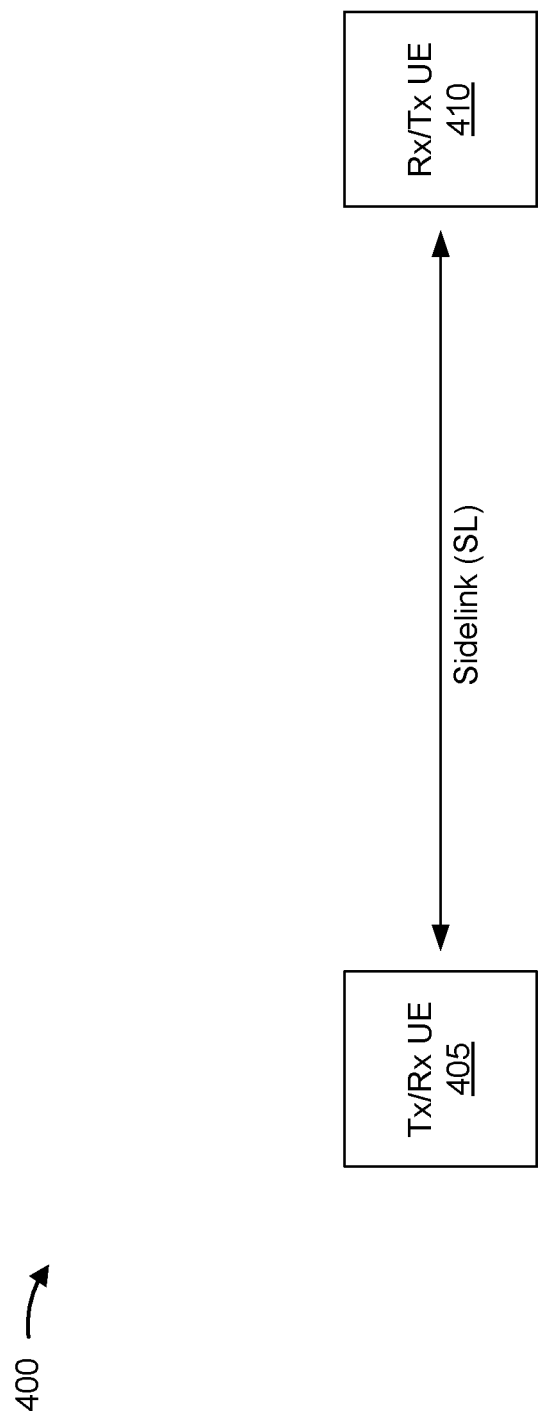
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx) UE 405 and a receiver (Rx) UE 410 may communicate with one another via a sidelink, as described above in connection with FIG. 3. The Tx UE 405 and/or the Rx UE 410 may correspond to one or more UEs described elsewhere herein, such as the UE 120 of FIG. 1. Thus, "sidelink" may refer to a direct link between UEs 120. Sidelink communications may be transmitted via the sidelink. In some aspects, the Tx UE 405 and the Rx UE 410 may communicate using a PC5 interface (e.g., without involvement from a base station or other centralized scheduling agent).

In some aspects, a base station may also communicate with the Tx/Rx UEs 405, 410 via access links. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
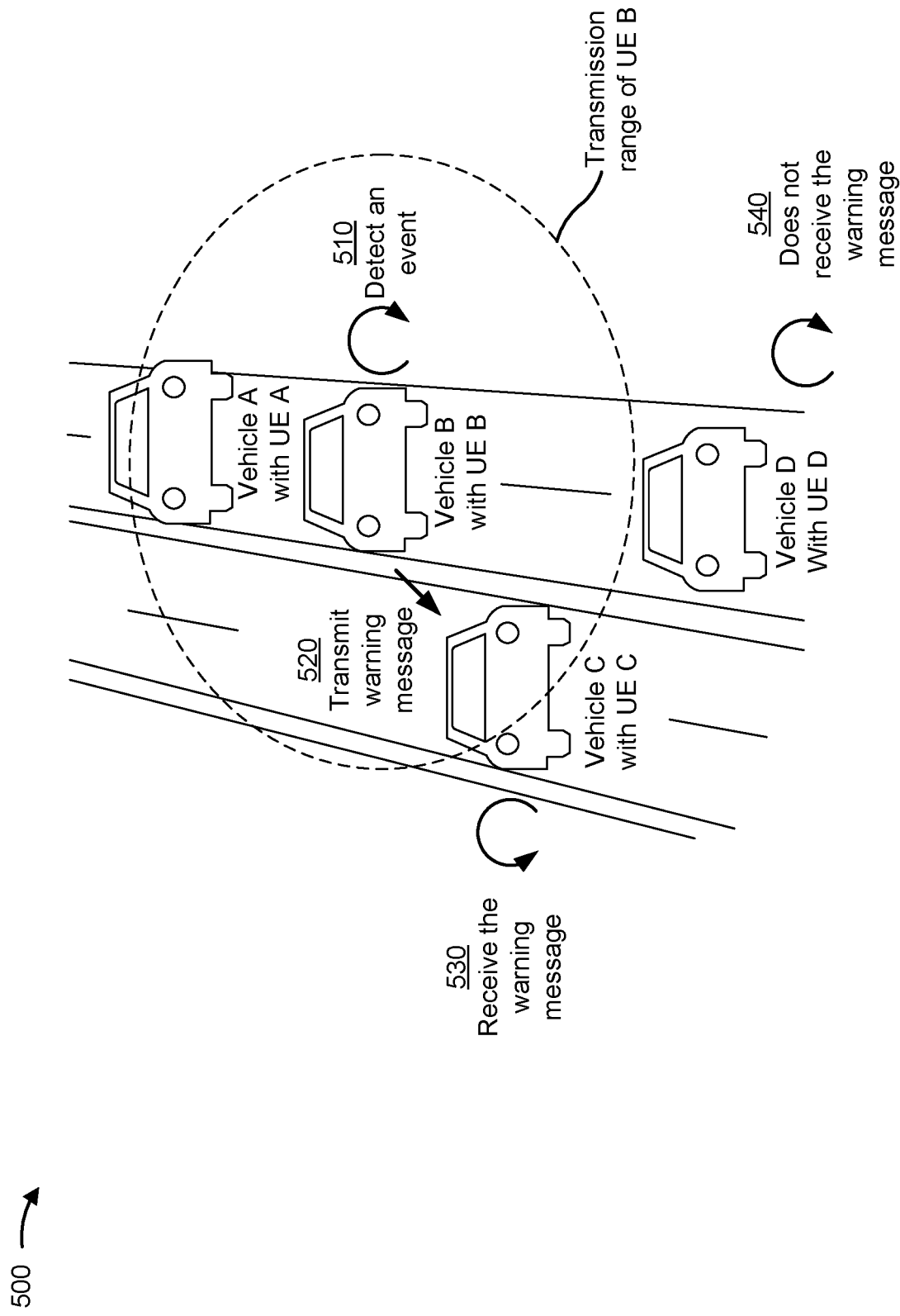
FIG. 5 illustrates an example of selective retransmission for vehicle-to-everything communications, in accordance with the present disclosure.

FIG. 5 is a diagram illustrating an example 500 of transmissions for V2X communications. FIG. 5 shows multiple vehicles with UEs including vehicle A with UE A, vehicle B with UE B, vehicle C with UE C, and vehicle D with UE D. The UEs may communicate using a cellular vehicle-to-everything (C-V2X) protocol.

As shown by reference number 510, vehicle B and/or UE B may detect an event and/or trigger an event. In some aspects, the event may include a lane change, a brake activation, and/or the like. In some aspects, vehicle B and/or UE B may use one or more sensors and/or other components of vehicle B to detect the event.

As shown by reference number 520, UE B may transmit a warning message to UE C. In some aspects, UE B may broadcast the warning message to multiple vehicles within a transmission range of UE B. In some aspects, UE B may unicast or multicast the warning message to one or more vehicles. As shown, vehicle A, UE A, vehicle C, and UE C may be within the transmission range of UE B.

As shown by reference number 530, vehicle C and/or UE C may receive the warning message. Vehicle C may perform one or more actions (e.g., slowing, changing lanes, and/or the like) based at least in part on receiving the warning message.

As shown by reference number 540, UE D may not receive the warning message. In some aspects, UE D may not receive the warning message based at least in part on vehicle D and/or UE D being outside of the transmission range of UE B. In some aspects, vehicle D and/or UE D may be outside of the transmission range of UE B based at least in part on terrain (e.g., hills and/or valleys), weather conditions, obstructions (e.g., natural obstructions, buildings, other vehicles, and/or the like), and/or the like that may limit the transmission range of UE B.

As indicated above, FIG. 5 is provided as an example. Other examples may differ from what is described with regard to FIG. 5.

In some cases, the transmission range of a UE (e.g., UE B) may not reach all vehicles that may benefit from the warning message. For example, based at least in part on a limited range of the transmission range of the UE, relative speeds of the multiple vehicles, and/or the like, the transmission range of the UE may not reach a UE of another vehicle at a distance that is sufficient for the UE of the other vehicle to receive the warning message with sufficient time and/or distance to properly react to the warning message.

In some examples, another vehicle (e.g., vehicle D) that is outside of the transmission range of the UE may travel with a speed relative to the UE and/or another UE that is above a threshold, such that once the other vehicle is within the transmission range of the UE, the other vehicle does not have sufficient time and/or distance to safely reduce speed and avoid a collision or other dangerous event. In some aspects, this may cause a chain reaction of collisions as additional cars traveling behind the other vehicle also do not receive the warning message from the UE, or a new warning message from the other vehicle, with sufficient time to properly react to the warning message.

In other examples, an emergency vehicle may travel on a road with one or more vehicles on a path between the emergency vehicle and a destination. A transmission range of a UE associated with the emergency vehicle may be insufficient to transmit a warning message (e.g., to clear the road) to the one or more vehicles with sufficient time and/or distance to properly react to the warning message before the emergency vehicle approaches the one or more vehicles. This may slow and/or delay the emergency vehicle from arriving at the destination.

In some aspects, a UE (e.g., UE 120), which may be associated with a vehicle, may receive a warning message from a detecting UE. The warning message may include a first indication of a priority of the warning message and a second indication that identifies an event detected by the detecting UE. The UE may transmit a repetition of the warning message based at least in part on the first indication. The UE may determine to transmit a repetition of the warning message (e.g., based at least in part on a determination that the UE has not already received a retransmission of the warning message from an intermediate UE). The receiving device may determine when to transmit a repetition of the warning message based at least in part on an offset from the reception of the warning message from the transmitting UE. In some aspects, the receiving device may randomly select the offset (e.g., based at least in part on an offset range).

In this way, the warning message may be received by vehicles that are outside of the transmission range of the UE that transmits the warning message. Additionally, based at least in part on the UE transmitting the warning message with the first indication of a priority of the warning message, a receiving UE may transmit a repetition of the warning message based at least in part on the detected event being an urgent event. In this way computing, communication, and/or network resources may be conserved, which may otherwise have been used to transmit a repetition of every warning message received by the receiving UE. In some aspects, by transmitting a repetition of urgent warning messages (e.g., instead of every warning message) received by the receiving UE, the UE may reduce a load for receivers of other UEs, reduce consumption of communication resources that could otherwise be used for transmission and/or reception of other messages, and/or the like.

Figure 6:
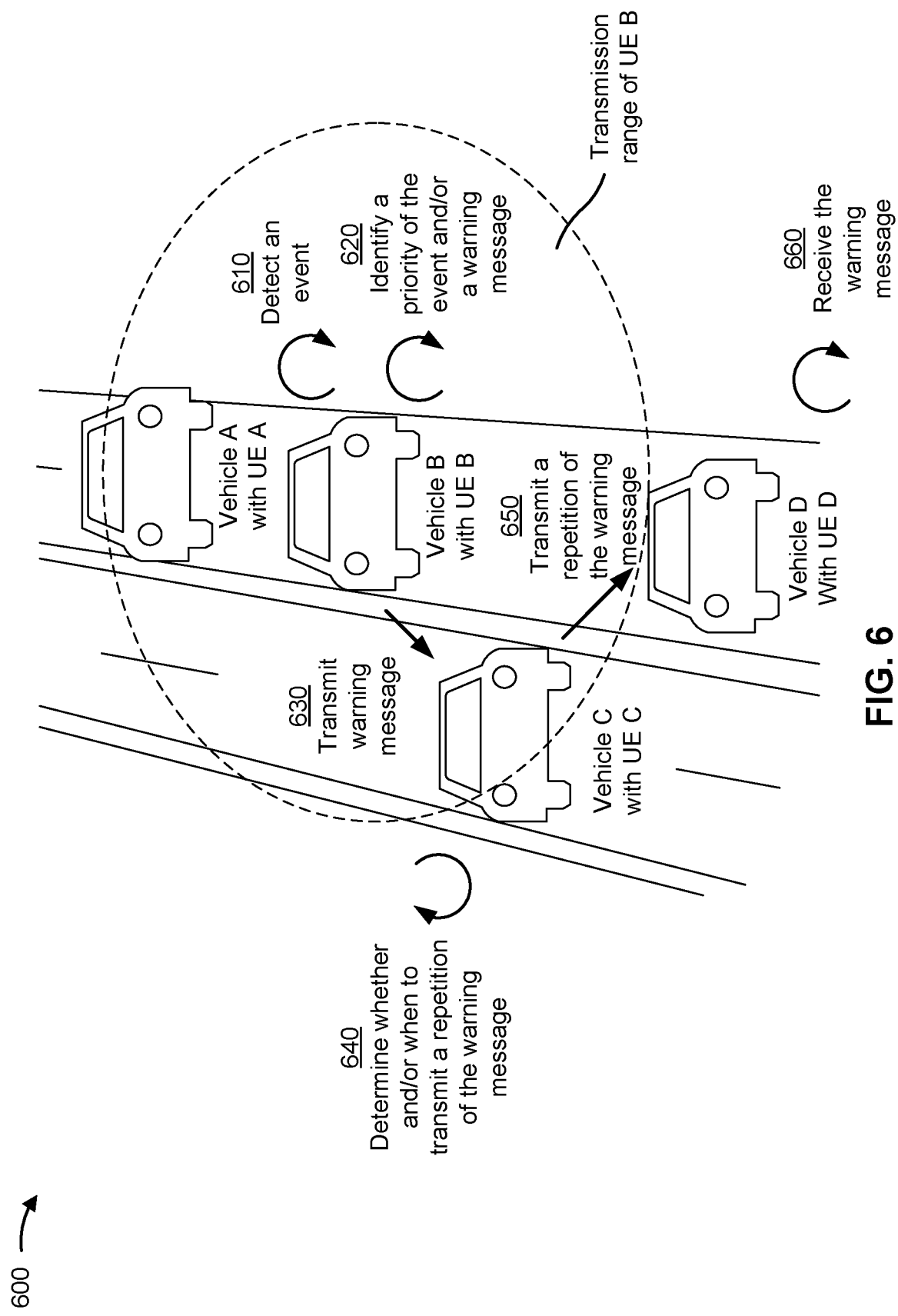
FIG. 6 is a diagram illustrating an example process performed, for example, by a UE, in accordance with the present disclosure.

FIG. 6 illustrates an example 600 of selective retransmission for V2X communications, in accordance with the present disclosure. FIG. 6 shows multiple vehicles with UEs (e.g., UEs 120) including vehicle A with UE A, vehicle B with UE B, vehicle C with UE C, and vehicle D with UE D. The UEs may communicate using a C-V2X protocol.

As shown by reference number 610, UE B may detect an event. In some aspects, UE B may detect the event based at least in part on receiving an indication of the event from vehicle B and/or one or more components (e.g., sensors) associated with vehicle B. In some aspects, UE B may detect that vehicle A is stopped or is moving with a speed that is fast or slow relative to a speed of vehicle B. In some aspects, detecting the event may include determining that a difference between a speed of vehicle A and a speed of vehicle B satisfies a threshold. In some aspects, UE B may detect an object in or near a path of vehicle B (e.g., an obstruction, a person, a hazard (e.g., ice or snow), and/or the like).

As shown by reference number 620, UE B may identify a priority of the event and/or a priority of a warning message to identify the event. For example, UE B may identify the detected event with a priority value (e.g., priority 1, priority 2, or the like). Identification of priority of the event and/or the priority of the warning message to identify the event may be based at least in part on a configuration of UE B. In some aspects, UE B may be configured to identify a detected event and/or the priority of the warning message to identify the event with a high priority based at least in part on one or more metrics, such as an event type of the detected event (e.g., a type of hazard, a type of object in or near the path of vehicle B and or UE B, and/or the like), a distance between vehicle B and/or UE B and an object associated with the detected event, a speed and/or velocity of vehicle B and/or UE B, rapid acceleration or deceleration of vehicle B and/or UE B, weather conditions, a number of vehicles near vehicle B and/or UE B (e.g., within a transmission range of UE B), and/or the like. In some aspects, UE B may use one or more metrics associated with the detected event and/or the warning message to identify the event to look up (e.g., in memory (e.g., memory 282) and/or other storage) a priority value of the detected event and/or the warning message to identify the event.

As shown by reference number 630, UE B may transmit a warning message. In some aspects, the warning message may include a first indication of a priority of the warning message and a second indication that identifies the event. UE C may determine to transmit a repetition of the warning message based at least in part on the first indication. In some aspects, UE B may transmit the warning message over one or more of a physical sidelink broadcast channel (PSBCH), a PSSCH, and/or a PSCCH, among other examples. For example, UE B may transmit control information associated with the warning message over the PSCCH and/or may transmit the warning message over the PSSCH. This may allow for transmission of the warning message without a delay to establish wireless connections with one or more receiving UEs. Avoiding the delay to establish wireless connections with the one or more receiving UEs may reduce latency for the one or more receiving UEs to receive the warning message and/or allow additional time for the receiving UEs to properly react to the warning message (e.g., by providing instructions to associated vehicles).

In some aspects, the first indication is included in SCI associated with the warning message. In other words, the first indication may be included in a physical layer of the warning message. By providing the first indication in the SCI and/or in the physical layer of the warning message, a receiving UE (e.g., UE C) may relatively quickly recognize the first indication (e.g., relative to recognizing an indication in a network layer or another layer) and determine that the receiving UE is to transmit a repetition of the warning message. This may reduce latency for the one or more receiving UEs to transmit a repetition of the warning message and/or allow additional time for the receiving UEs to properly react to the warning message (e.g., by providing instructions to associated vehicles).

In some aspects, the warning message may identify a location of UE B, a location of the detected event, an event type of the event, UE B as the UE that detected the detected event, a time at which the warning message was transmitted by UE B, a location, and/or the like. In this way, a UE that receives the warning message, either directly or indirectly from UE B, may determine a source of the warning message, a location of the detected event, a timing of an original transmission of the warning message (e.g., a subframe index (e.g., SF idx)), and/or the like.

In some aspects, the warning message may indicate that an offset (e.g., a random offset) should be applied before transmitting a repetition of the warning message. The offset may indicate, for example, a number of subframes between reception of the warning message and retransmission of the warning message by a receiving UE. In some aspects, the warning message may identify the offset, as selected by the UE. In some aspects, the warning message may indicate that the receiving UE is to generate the offset. For example, the warning message may indicate that the receiving UE is to randomly generate the offset based at least in part on one or more parameters. In some aspects, the one or more parameters may identify an offset range (e.g., a maximum offset) that the receiving UE is to apply to generate the offset.

In some aspects, the warning message may identify one or more parameters for determining whether to transmit a repetition of the warning message. In some aspects, the warning message may indicate a hop number threshold and/or a hop counter that indicates a count of hops by the warning message. In some aspects, the receiving UE is to selectively transmit a repetition of the warning message based at least in part on the hop number threshold and the count of hops. For example, the receiving UE may transmit a repetition of the warning message based at least in part on the count of hops satisfying the hop number threshold (e.g., by being less than the hop number threshold, by being less than or equal to the hop number threshold, and/or the like). In some aspects, the hop quantity threshold may be based at least in part on an indication of the hop quantity threshold within the warning message, a location of the receiving UE, a location of a detecting UE that detected the event, the priority of the warning message, an event type of the event, a time of the event, or a configuration of the receiving UE.

In some aspects, the hop number threshold may be set to 1 so that a warning message is limited to only a single transmission of a repetition. For example, the receiving UE may be configured with a hop number threshold of 1 and a hop counter may be an indication (e.g., a single bit indication) that a received warning message is a transmission of a repetition. Based at least in part on the hop number threshold being set to 1 and the received warning message including an indication that the received warning message is a repetition, the receiving UE may determine to not transmit a repetition of the received warning message.

Based at least in part on the receiving UE transmitting a repetition of the warning message based at least in part on a hop number threshold and the hop count, the receiving UE may avoid transmitting a repetition of warning messages that are stale and/or that have a relatively high likelihood of already being received by UEs that are within a transmission range of the receiving UE. This may conserve computing, communication, and/or network resources that may otherwise be used to receive, process, and transmit a high (e.g., unlimited) number of repetitions, stale warning messages, or warning messages that have likely already been received from another source by likely recipients. Additionally, or alternatively, this may provide a control to limit an amount of increased traffic based at least in part on repetitions, which may conserve network resources.

In some aspects, the UE may be configured with a total offset threshold for the warning message (e.g., a maximum offset from an original transmission of the warning message after which a receiving UE is not to transmit a repetition of the warning message). In some aspects, the warning message may identify the total offset threshold for the warning message. The warning message may indicate that a receiving UE is to selectively transmit a repetition of the warning message based at least in part on the total offset threshold and a total offset of the transmission of a repetition of the warning message from the transmission of the warning message. For example, the warning message may indicate that a receiving UE may transmit a repetition of the warning message based at least in part on a total offset satisfying the total offset threshold. The total offset may be defined as a number of subframes between the transmission of a repetition (e.g., as scheduled based at least in part on the offset between reception of the warning message and transmission of a repetition of the warning message) and an original transmission of the warning message by the UE that detected the detected event (e.g., as indicated in the warning message). In some aspects, the receiving UE may determine the total offset threshold based at least in part on a configuration of the receiving UE, by an indication in the warning message, and/or the like.

Based at least in part on the receiving UE transmitting a repetition of the warning message, which is based at least in part on a total offset threshold and the total offset, the receiving UE may avoid transmitting a repetition of warning messages that are expired and/or stale. This may conserve computing, communication, and/or network resources that may otherwise be used to receive, process, and transmit expired and/or stale warning messages.

As shown by reference number 640, UE C (the receiving UE) may receive the warning message from UE B and determine whether and/or when to transmit a repetition of the warning message. In some aspects, UE C may receive the warning message based at least in part on a C-V2X protocol. In some aspects, UE C may receive the warning message over a PSBCH, a PSSCH, and/or a PSCCH, among other examples. For example, UE C may receive control information associated with the warning message via the PSCCH and/or may receive the warning message via the PSSCH. In some aspects, UE C may identify the first indication in a physical layer of the warning message and/or in SCI associated with the warning message. In some aspects, UE C may identify an identification of UE B as the UE that detected the detected event, a location of UE B, a location of the detected event, a priority of the warning message, a time of the event, an event type of the detected event, an indication of a hop quantity threshold, and/or the like.

In some aspects, the UE may determine to transmit the repetition of the warning message based at least in part on the priority of the warning message satisfying a priority threshold. In some aspects, the priority threshold may be based at least in part on a channel busyness, a location of the receiving UE, and/or the like.

In some aspects, UE C may identify, within the warning message, an offset to indicate a number of subframes between reception of the warning message and transmission of a repetition of the warning message by the UE. In some aspects, UE C may identify, within the warning message and/or based at least in part on a configuration of UE C, an indication that UE C is to generate an offset (e.g., randomly or randomly with parameters) to indicate a number of subframes between reception of the warning message and transmission of a repetition of the warning message by the UE. In some aspects, UE C may identify, within the warning message and/or based at least in part on a configuration of UE C, an offset range that UE C is to apply to generate the offset. For example, the offset range may be defined based at least in part on a priority of the detected event and/or the warning message, an event type of the detected event, a configuration of UE C, a location of the detected event, a location of UE B, and/or the like.

UE C may determine whether to transmit a repetition of the warning message based at least in part on one or more parameters within the warning message and/or based at least in part on the configuration of UE C. In some aspects, the configuration of UE C may define one or more thresholds (e.g., the hop number threshold, the total offset threshold, and/or the like). In some aspects, the warning message may define one or more thresholds. UE C may compare the one or more thresholds with one or more metrics determined from the warning message. For example, UE C may selectively transmit a repetition of the warning message based at least in part on the hop number threshold and the count of hops. In other examples, UE C may selectively transmit a repetition of the warning message based at least in part on the total offset threshold and a total offset of the transmission of a repetition of the warning message from the reception of the warning message. In some aspects, as described below with respect to FIG. 7, a receiving UE (e.g. UE C) may selectively transmit the warning message based at least in part on a determination that the receiving UE has not already received a transmission of a repetition of a received warning message from an intermediate UE.

As shown by reference number 650, UE C may transmit a repetition of the warning message based at least in part on the second indication. In some aspects, UE C may transmit a repetition of the warning message based at least in part on a C-V2X protocol. For example, UE C may transmit a repetition of the warning message over a PSBCH, a PSSCH, and/or a PSCCH, among other examples. For example, UE C may transmit control information associated with the repetition of the warning message via the PSCCH and/or may transmit the repetition of the warning message via the PSSCH. In some aspects, UE C may provide an indication that the transmission is a repetition of an original warning message, increment a hop counter, indicate a time of the transmission of the repetition (e.g., relative to the original message), and/or the like within the repetition of the warning message. In some aspects, UE C may indicate, within the warning message, a timing offset between receiving the warning message and transmitting the repetition of the warning message.

As shown by reference number 660, UE D may receive the warning message based at least in part on the transmission of the repetition by UE C. In this way, UE D may receive the warning message even when UE D is out of the transmission range of UE B. Additionally, using one or more of the systems and/or techniques described herein, one or more controls may be placed to limit an amount of increased traffic (e.g., wireless traffic and/or network traffic) based at least in part on repetitions (e.g., by limiting unnecessary repetitions of expired and/or stale warning messages).

As indicated above, FIG. 6 is provided as an example. Other examples may differ from what is described with respect to FIG. 6.

Figure 7:
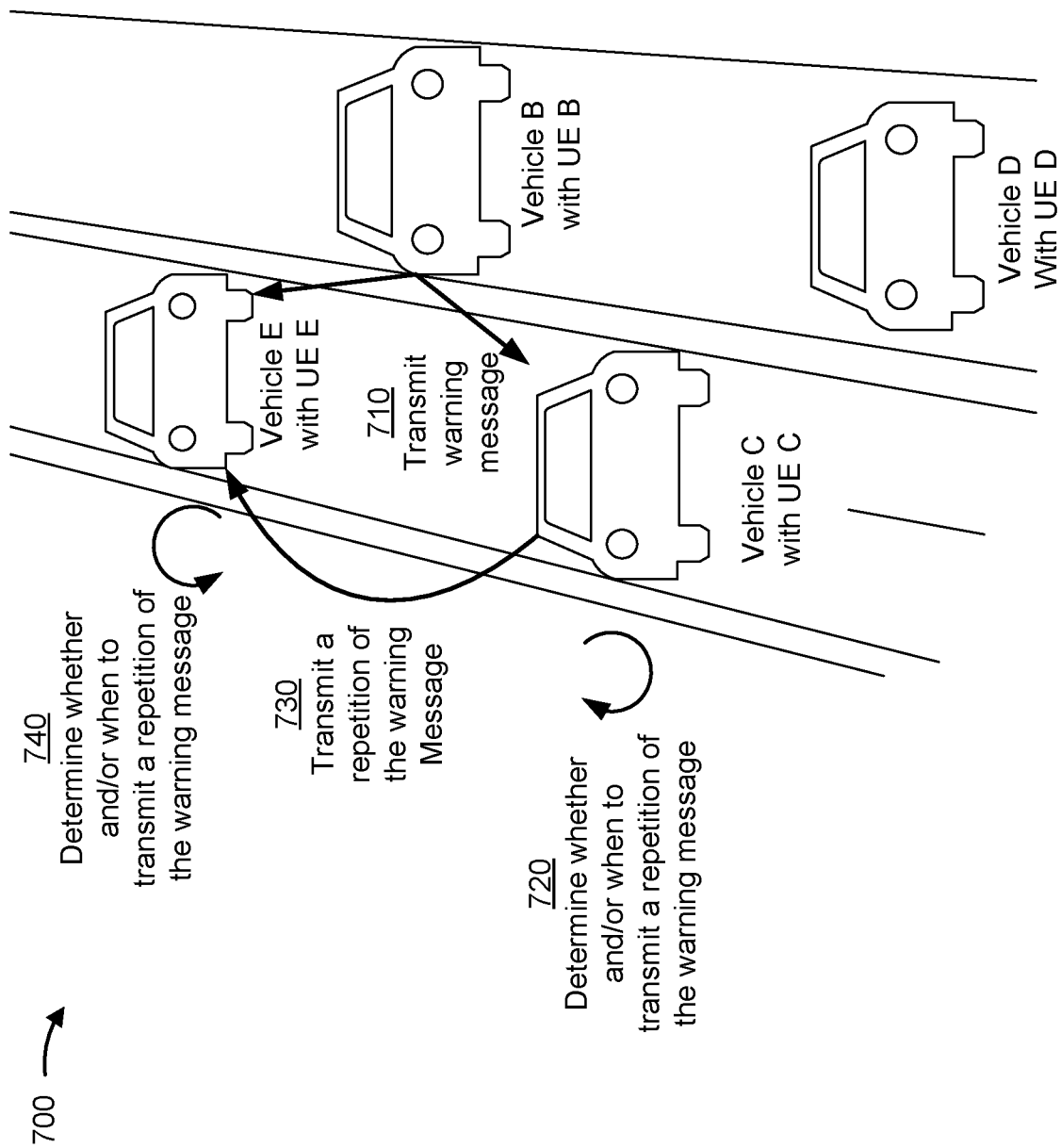
FIG. 7 is a diagram illustrating an example process performed, for example, by a UE, in accordance with the present disclosure.

FIG. 7 illustrates an example 700 of selective transmission of a repetition for C-V2X communications, in accordance with the present disclosure. FIG. 7 shows multiple vehicles with UEs (e.g., UEs 120) including vehicle B with UE B, vehicle C with UE C, vehicle D with UE D, and vehicle E with UE E. The UEs may communicate using a C-V2X protocol.

As shown by reference number 710, UE B may transmit a warning message to UE C and UE E. In some aspects, UE B may transmit the warning message over a PSBCH, a PSSCH, and/or a PSCCH, among other examples so that multiple UEs within a transmission range of UE B may receive the warning message.

As shown by reference number 720, UE C may determine whether and/or when to transmit a repetition of the warning message. In some aspects, UE C may determine to transmit a repetition of the warning message based at least in part on one or more of a configuration of UE C, one or more metrics associated with the warning message, an indication within the warning message, and/or the like as discussed above an indication in the warning message.

As shown by reference number 730, UE C may transmit a repetition of the warning message. In some aspect, UE C may transmit the warning message based at least in part on a determination that UE C has not already received a transmission of a repetition of the warning message from an intermediate UE after receiving the transmission from UE B and before transmitting a repetition of the warning message. In some aspects, multiple UEs (e.g., including UE D and/or UE E) may receive the transmission of a repetition of the warning message.

As shown by reference number 740, UE E may determine whether and/or when to transmit a repetition of the warning message. In some aspects, based at least in part on receiving the transmission from UE B, UE E may initially determine that UE E is to transmit a repetition of the warning message based at least in part on one or more parameters. In some aspects, UE E may generate an offset for a transmission of a repetition of the warning message.

UE E may receive the transmission of a repetition of the warning message from UE C before UE E transmits a repetition of the warning message (e.g., based at least in part on an offset generated by UE E being greater than an offset generated by UE C). For example, UE E may monitor traffic as usual during a determined offset before transmitting the repetition of the warning message, and may detect that a same warning message was already repeated by another UE. Based at least in part on detecting that the same warning message was already repeated by another UE, UE may drop the intended repetition.

UE E may determine that the transmission of a repetition from UE C includes a same warning message as received in the transmission from UE B based at least in part on one or more metrics in the warning message. For example, the one or more metrics may include indications of a time of the event, an indication of a time of an original transmission of the warning message, an indication of an identity of a detecting UE, a location of the detecting UE, and/or the like.

In some aspects, UE E may determine that the transmission of a repetition from UE C includes a same warning message as received in the transmission from UE B, based at least in part on a differential time stamp in the warning message introduced within a reserved field of SCI. For example, UE E may, upon reception of the warning message from UE C, determine a subframe index of an original transmission of the warning message associated with the warning message received from UE C. In some aspects, one or more SCI fields may provide additional parameters to correlate the warning message received from UE C with the parameters (e.g., like allocation size, MCS, priority) of the warning message received from UE B. In this way, UE E may identify the original warning message corresponding to the repetition of the warning message received from UE C.

Based at least in part on UE E receiving the transmission of a repetition from UE C and determining that the transmission of a repetition from UE C is a transmission of a repetition of the transmission from UE B, UE E may determine to drop a scheduled transmission of a repetition of the same warning message (e.g., to not transmit a repetition of the same warning message).

Based at least in part on the techniques and/or systems described herein, a repetition of a warning message may be transmitted outside of a transmission range of a UE that detects a detected event. Additionally, an added load on a network supporting the transmissions may be limited based at least in part on constraints for transmissions of repetitions (e.g., based at least in part on a hop number threshold, a total offset threshold, dropping a transmission of a repetition if a transmission of a repetition of the same warning message is received, and/or the like). In some aspects, the constraints for transmission of a repetition may be configured based at least in part on a network load, network business, and/or an expected network load to allow for additional transmissions of repetitions when the network can support the additional transmissions of repetitions without overloading the network.

As indicated above, FIG. 7 is provided as an example. Other examples may differ from what is described with respect to FIG. 7.

Figure 8:
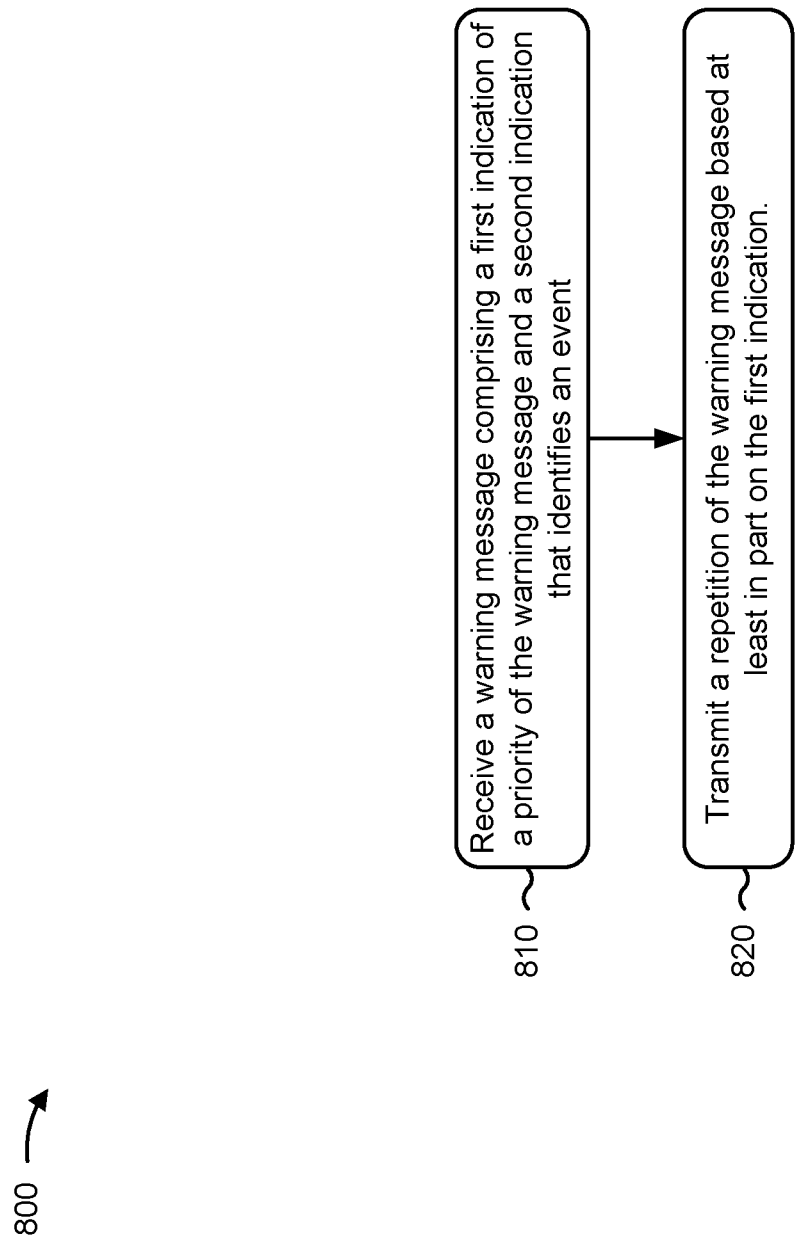
FIG. 8 is a diagram illustrating an example process performed, for example, by a UE, in accordance with the present disclosure.

FIG. 8 is a diagram illustrating an example process 800 performed, for example, by a UE, in accordance with the present disclosure. Example process 800 is an example where the UE (e.g., UE 120 and/or the like) performs operations associated with selective retransmission for vehicle-to-everything communications.

As shown in FIG. 8, in some aspects, process 800 may include receiving a warning message comprising a first indication of a priority of the warning message and a second indication that identifies an event (block 810). For example, the UE (e.g., using receive processor 258, transmit processor 264, controller/processor 280, memory 282, and/or the like) may receive a warning message comprising a first indication of a priority of the warning message and a second indication that identifies an event, as described above.

As further shown in FIG. 8, in some aspects, process 800 may include transmitting a repetition of the warning message based at least in part on the first indication (block 820). For example, the UE (e.g., using receive processor 258, transmit processor 264, controller/processor 280, memory 282, and/or the like) may transmit a repetition of the warning message based at least in part on the first indication, as described above.

Process 800 may include additional aspects, such as any single aspect or any combination of aspects described below and/or in connection with one or more other processes described elsewhere herein.

In a first aspect, process 800 includes determining to transmit the repetition of the warning message based at least in part on the priority of the warning message satisfying a priority threshold, and transmitting the repetition of the warning message is based at least in part on the determination to transmit the repetition of the warning message.

In a second aspect, alone or in combination with the first aspect, the priority threshold is based at least in part on one or more of a channel busyness or a location of the UE.

In a third aspect, alone or in combination with one or more of the first and second aspects, the priority of the warning message is based at least in part on an event type of the event.

In a fourth aspect, alone or in combination with one or more of the first through third aspects, process 800 includes indicating, within the repetition of the warning message, that the repetition of the warning message is a repetition.

In a fifth aspect, alone or in combination with one or more of the first through fourth aspects, process 800 includes indicating, within the repetition of the warning message, a timing offset between receiving the warning message and transmitting the repetition of the warning message.

In a sixth aspect, alone or in combination with one or more of the first through fifth aspects, the warning message comprises a control portion and a data portion, and the first indication is included within the control portion.

In a seventh aspect, alone or in combination with one or more of the first through sixth aspects, receiving the warning message includes receiving the control portion via a PSCCH and receiving the data portion via a PSSCH.

In an eighth aspect, alone or in combination with one or more of the first through seventh aspects, receiving the warning message includes receiving the warning message as a broadcast message.

In a ninth aspect, alone or in combination with one or more of the first through eighth aspects, the UE is associated with a vehicle and reception of the warning message is based at least in part on a C-V2X protocol.

In a tenth aspect, alone or in combination with one or more of the first through ninth aspects, the warning message identifies at least one of an identification of a detecting UE that detected the event, a location of the detecting UE, an event type of the event, a time at which the warning message was transmitted by a detecting device that detected the event, or a location of the event.

In an eleventh aspect, alone or in combination with one or more of the first through tenth aspects, process 800 includes determining a timing offset of a number of subframes between reception of the warning message and transmission of the repetition of the warning message by the UE.

In a twelfth aspect, alone or in combination with one or more of the first through eleventh aspects, the timing offset is a random timing offset.

In a thirteenth aspect, alone or in combination with one or more of the first through twelfth aspects, process 800 includes generating the random timing offset based at least in part on a offset range.

In a fourteenth aspect, alone or in combination with one or more of the first through thirteenth aspects, the offset range is based at least in part on an indication within the warning message.

In a fifteenth aspect, alone or in combination with one or more of the first through fourteenth aspects, the offset range is based at least in part on the priority of the warning message or an event type of the event.

In a sixteenth aspect, alone or in combination with one or more of the first through fifteenth aspects, process 800 includes determining to transmit a repetition of the warning message based at least in part on a determination that the UE has not already received a transmission of a repetition of the warning message from an intermediate UE.

In a seventeenth aspect, alone or in combination with one or more of the first through sixteenth aspects, process 800 includes selectively transmitting the repetition of the warning message based at least in part on a hop quantity threshold and a count of hops indicated within the warning message.

In an eighteenth aspect, alone or in combination with one or more of the first through seventeenth aspects, the hop quantity threshold is based at least in part on one or more of an indication of the hop quantity threshold within the warning message, a location of the UE, a location of a detecting UE that detected the event, the priority of the warning message, an event type of the event, a time of the event, or a configuration of the UE.

In a nineteenth aspect, alone or in combination with one or more of the first through eighteenth aspects, the hop quantity threshold is one hop.

In a twentieth aspect, alone or in combination with one or more of the first through nineteenth aspects, process 800 includes determining whether receiving the warning message comprises receiving a repetition of the warning message.

In a twenty-first aspect, alone or in combination with one or more of the first through twentieth aspects, determining whether receiving the warning message comprises receiving a repetition of the warning message comprises one or more of determining whether the warning message includes an indication that the warning message is a repetition, or determining whether an indication of a transmission time of an original warning message indicates a same transmission time as an indication of a transmission time of the warning message.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The following provides an overview of some aspects of the present disclosure:

Aspect 1: A method of wireless communication performed by a user equipment (UE) comprising: receiving a warning message comprising a first indication of a priority of the warning message and a second indication that identifies an event; and transmitting a repetition of the warning message based at least in part on the first indication.

Aspect 2: The method of aspect 1, further comprising: determining to transmit the repetition of the warning message based at least in part on the priority of the warning message satisfying a priority threshold, wherein transmitting the repetition of the warning message is based at least in part on the determination to transmit the repetition of the warning message.

Aspect 3: The method of aspect 2, wherein the priority threshold is based at least in part on one or more of a channel busyness or a location of the UE.

Aspect 4: The method of any of aspects 1 through 3, further comprising indicating, within the repetition of the warning message, that the repetition of the warning message is a repetition.

Aspect 5: The method of any of aspects 1 through 4, further comprising indicating, within the repetition of the warning message, a timing offset between receiving the warning message and transmitting the repetition of the warning message.

Aspect 6: The method of any of aspects 1 through 5, wherein the warning message identifies at least one of: an identification of a detecting UE that detected the event, a location of the detecting UE, an event type of the event, a time at which the warning message was transmitted by a detecting device that detected the event, or a location of the event.

Aspect 7: The method of any of aspects 1 through 6, further comprising: determining a timing offset of a number of subframes between reception of the warning message and transmission of the repetition of the warning message by the UE.

Aspect 8: The method of aspect 7, wherein the timing offset is a random timing offset.

Aspect 9: The method of aspect 8, further comprising: generating the random timing offset based at least in part on an offset range.

Aspect 10: The method of aspect 9, wherein the offset range is based at least in part on one or more of: an indication within the warning message, or the priority of the warning message or an event type of the event.

Aspect 11: The method of any of aspects 1 through 10, further comprising: determining to transmit the repetition of the warning message based at least in part on one or more of: a determination that the UE has not already received a transmission of a repetition of the warning message from an intermediate UE, or a determination that a count of hops indicated within the warning message satisfies a hop quantity threshold.

Aspect 12: The method of aspect 11, wherein the hop quantity threshold is based at least in part on one or more of: an indication of the hop quantity threshold within the warning message, a location of the UE, a location of a detecting UE that detected the event, the priority of the warning message, an event type of the event, a time of the event, or a configuration of the UE.

Aspect 13: The method of aspect 11, wherein the hop quantity threshold is one hop.

Aspect 14: The method of any of aspects 1 through 13, further comprising: determining whether receiving the warning message comprises receiving a repetition of the warning message based at least in part on one or more of: a determination of whether the warning message includes an indication that the warning message is a repetition, or a determination of whether an indication of a transmission time of an original warning message indicates a same transmission time as an indication of a transmission time of the warning message.

Aspect 15: An apparatus for wireless communication at a device, comprising a processor; memory coupled with the processor; and instructions stored in the memory and executable by the processor to cause the apparatus to perform the method of one or more aspects of aspects 1-14.

Aspect 16: A device for wireless communication, comprising a memory and one or more processors coupled to the memory, the memory and the one or more processors configured to perform the method of one or more aspects of aspects 1-14.

Aspect 17: An apparatus for wireless communication, comprising at least one means for performing the method of one or more aspects of aspects 1-14.

Aspect 18: A non-transitory computer-readable medium storing code for wireless communication, the code comprising instructions executable by a processor to perform the method of one or more aspects of aspects 1-14.

Aspect 19: A non-transitory computer-readable medium storing a set of instructions for wireless communication, the set of instructions comprising one or more instructions that, when executed by one or more processors of a device, cause the device to perform the method of one or more aspects of aspects 1-14.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
a memory; and
one or more processors operatively coupled to the memory, the memory and the one or more processors configured to:
receive a warning message comprising a first indication of a priority of the warning message and a second indication that identifies an event;
transmit a repetition of the warning message based at least in part on the first indication; and
determine a timing offset of a number of subframes between reception of the warning message and transmission of the repetition of the warning message by the UE;
wherein the timing offset is a random timing offset.

2. The UE of claim 1, wherein the one or more processors are further configured to:
determine to transmit the repetition of the warning message based at least in part on the priority of the warning message satisfying a priority threshold,
wherein transmitting the repetition of the warning message is based at least in part on the determination to transmit the repetition of the warning message.

3. The UE of claim 2, wherein the priority threshold is based at least in part on one or more of a channel busyness or a location of the UE.

4. The UE of claim 1, wherein the one or more processors are further configured to indicate, within the repetition of the warning message, that the repetition of the warning message is a repetition.

5. The UE of claim 1, wherein the one or more processors are further configured to indicate, within the repetition of the warning message, a timing offset between receiving the warning message and transmitting the repetition of the warning message.

6. The UE of claim 1, wherein the warning message identifies at least one of:
an identification of a detecting UE that detected the event,
a location of the detecting UE,
an event type of the event,
a time at which the warning message was transmitted by a detecting device that detected the event, or
a location of the event.

7. The UE of claim 1, wherein the one or more processors are further configured to:
generate the random timing offset based at least in part on an offset range.

8. The UE of claim 7, wherein the offset range is based at least in part on one or more of:
an indication within the warning message, or
the priority of the warning message or an event type of the event.

9. The UE of claim 1, wherein the one or more processors are further configured to:
determine to transmit the repetition of the warning message based at least in part on one or more of:
a determination that the UE has not already received a transmission of a repetition of the warning message from an intermediate UE, or
a determination that a count of hops indicated within the warning message satisfies a hop quantity threshold.

10. The UE of claim 9, wherein the hop quantity threshold is based at least in part on one or more of:
an indication of the hop quantity threshold within the warning message,
a location of the UE,
a location of a detecting UE that detected the event,
the priority of the warning message,
an event type of the event,
a time of the event, or
a configuration of the UE.

11. The UE of claim 9, wherein the hop quantity threshold is one hop.

12. The UE of claim 1, wherein the one or more processors are further configured to:
determine whether receiving the warning message comprises receiving a repetition of the warning message based at least in part on one or more of:
a determination of whether the warning message includes an indication that the warning message is a repetition, or
a determination of whether an indication of a transmission time of an original warning message indicates a same transmission time as an indication of a transmission time of the warning message.

13. A method of wireless communication performed by a user equipment (UE) comprising:
receiving a warning message comprising a first indication of a priority of the warning message and a second indication that identifies an event;
transmitting a repetition of the warning message based at least in part on the first indication; and
determining a timing offset of a number of subframes between reception of the warning message and transmission of the repetition of the warning message by the UE;
wherein the timing offset is a random timing offset.

14. The method of claim 13, further comprising:
determining to transmit the repetition of the warning message based at least in part on the priority of the warning message satisfying a priority threshold,
wherein transmitting the repetition of the warning message is based at least in part on the determination to transmit the repetition of the warning message.

15. The method of claim 14, wherein the priority threshold is based at least in part on one or more of a channel busyness or a location of the UE.

16. The method of claim 13, further comprising indicating, within the repetition of the warning message, that the repetition of the warning message is a repetition.

17. The method of claim 13, further comprising indicating, within the repetition of the warning message, a timing offset between receiving the warning message and transmitting the repetition of the warning message.

18. The method of claim 13, wherein the warning message identifies at least one of:
an identification of a detecting UE that detected the event,
a location of the detecting UE,
an event type of the event,
a time at which the warning message was transmitted by a detecting device that detected the event, or
a location of the event.

19. The method of claim 13, further comprising:
generating the random timing offset based at least in part on an offset range.

20. The method of claim 19, wherein the offset range is based at least in part on one or more of:
an indication within the warning message, or
the priority of the warning message or an event type of the event.

21. The method of claim 13, further comprising:
determining to transmit the repetition of the warning message based at least in part on one or more of:
a determination that the UE has not already received a transmission of a repetition of the warning message from an intermediate UE, or
a determination that a count of hops indicated within the warning message satisfies a hop quantity threshold.

22. The method of claim 21, wherein the hop quantity threshold is based at least in part on one or more of:
an indication of the hop quantity threshold within the warning message,
a location of the UE,
a location of a detecting UE that detected the event,
the priority of the warning message,
an event type of the event,
a time of the event, or
a configuration of the UE.

23. The method of claim 21, wherein the hop quantity threshold is one hop.

24. The method of claim 13, further comprising:
determining whether receiving the warning message comprises receiving a repetition of the warning message based at least in part on one or more of:
a determination of whether the warning message includes an indication that the warning message is a repetition, or
a determination of whether an indication of a transmission time of an original warning message indicates a same transmission time as an indication of a transmission time of the warning message.

25. A non-transitory computer-readable medium storing a set of instructions for wireless communication, the set of instructions comprising:
one or more instructions that, when executed by one or more processors of a user equipment (UE), cause the UE to:
receive a warning message comprising a first indication of a priority of the warning message and a second indication that identifies an event;
transmit a repetition of the warning message based at least in part on the first indication; and
determine a timing offset of a number of subframes between reception of the warning message and transmission of the repetition of the warning message by the UE;
wherein the timing offset is a random timing offset.

26. An apparatus for wireless communication, comprising:
means for receiving a warning message comprising a first indication of a priority of the warning message and a second indication that identifies an event;
means for transmitting a repetition of the warning message based at least in part on the first indication; and
means for determining a timing offset of a number of subframes between reception of the warning message and transmission of the repetition of the warning message by the UE;
wherein the timing offset is a random timing offset.

* * * * *